US008564820B2

(12) United States Patent
Funane

(10) Patent No.: US 8,564,820 B2
(45) Date of Patent: Oct. 22, 2013

(54) INFORMATION PROCESSING APPARATUS, IMAGE FORMING DEVICE, AND SYSTEM AND METHOD THEREOF

(75) Inventor: Nao Funane, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 218 days.

(21) Appl. No.: 13/087,235

(22) Filed: Apr. 14, 2011

(65) Prior Publication Data

US 2011/0261403 A1 Oct. 27, 2011

(30) Foreign Application Priority Data

Apr. 26, 2010 (JP) ................................. 2010-100816

(51) Int. Cl.
*G06F 3/12* (2006.01)

(52) U.S. Cl.
USPC ............ 358/1.15; 358/1.1; 358/1.6; 707/966; 707/770; 707/771; 718/104; 718/100; 709/228; 709/203; 709/227

(58) Field of Classification Search
None
See application file for complete search history.

(56) References Cited

U.S. PATENT DOCUMENTS 8,144,351 B2 * 3/2012 Sato ............................ 358/1.15
2007/0035767 A1 * 2/2007 Numata ....................... 358/1.15
2008/0204799 A1 * 8/2008 Sato ............................ 358/1.15

FOREIGN PATENT DOCUMENTS

CN 1677419 A 10/2005
JP 2000-207413 A 7/2000

OTHER PUBLICATIONS

Machine translation of Japanese Appl. No. 2000-207413 by Yamashita et al., published Jul. 28, 2000.*

* cited by examiner

*Primary Examiner* — Paul F Payer
(74) *Attorney, Agent, or Firm* — Canon U.S.A, Inc. IP Division

(57) ABSTRACT

According to the present invention, an apparatus that communicates with a data management system sets a condition for acquiring data from the data management system, collects data of an image forming device, adds a key matching the set condition to the collected data, and transmits the data to which the key is added, to the data management system.

20 Claims, 13 Drawing Sheets

FIG. 8

| COUNT SETTING ID | CLIENT CODE TO BE COUNTED | COUNT STARTING DATE | COUNT ENDING DATE |
|---|---|---|---|
| 1 | <B Co., Limited>-<DEPARTMENT Y> | 2010/1/1 | 2010/6/30 |
| 2 | <A Co., Limited>-<DEPARTMENT X> | 2010/1/1 | 2010/3/31 |
| 3 | <C Co., Limited>-<ALL> | 2010/4/1 | 2010/4/30 |

FIG. 9

| JOB ID | CLIENT CODE ADDED TO JOB | KEY |
|---|---|---|
| 1 | <A Co., Limited>-<DEPARTMENT X> | A-X |
| 2 | <C Co., Limited>-<DEPARTMENT X> | C-ALL |
| 3 | <B Co., Limited>-<DEPARTMENT Y> | B-Y |
| 4 | <C Co., Limited>-<DEPARTMENT Z> | C-ALL |
| 5 | <A Co., Limited>-<DEPARTMENT Z> | |
| 6 | <B Co., Limited>-<DEPARTMENT Y> | B-Y |

INFORMATION PROCESSING APPARATUS, IMAGE FORMING DEVICE, AND SYSTEM AND METHOD THEREOF

BACKGROUND OF THE INVENTION

1. Field of the Invention

The present invention relates to a technique for managing data collected from an image forming device.

2. Description of the Related Art

An image forming device such as copy machine generally adopts a method for counting actual use records of printing and charging according to use of the image forming device. For example, a count server installed in an intranet collects record information from a plurality of devices and stores the record information therein. The count server searches for the actual use records of a user to be charged from data of all record information, counts the use records, and then charges therefor.

Further, a method for efficiently searching data is discussed (refer to Japanese Patent Application Laid-Open No. 2000-207413). According to this method, databases are chronologically separated and stored according to a time when data is created. A user designates information that can specify the database when searching the data to narrow down an area of the specified database as a searching object. And then, search is performed.

On the other hand, in companies, the data has been typically managed by servers in the intranet of their own companies. However, when the data to be managed is increased, management and operation of the server takes a lot of works, for example, and storages are to be increased. To address this situation, regarding a method for storing the data, services (storage service) for providing the storages (region for storing the data) on the internet have become popular. The user can use this storage service to store the data in the storage on the internet.

By using the storage service, the companies can store the data without directly managing the actual storage server. For example, even if a data size that can be used is fixed by a contract for the storage service, the user can easily increase the storage, by updating the contract, thereby reducing management works.

Since large companies have an enormous number of devices to be counted, the record information to be collected can be also enormous. When a system providing the above-described storage service subsequently stores the record information to be collected, the storage of the enormous data may be separately disposed in a plurality of devices (i.e., servers). However, when the data is separately disposed in the storage regions of the plurality of devices, performance for searching and collecting the data from the system can be deteriorated.

The actual use records may be counted for various purposes, and different types of data may be collectively acquired at a time depending on the purpose. For example, when a specified user is to be charged, the data of the user's actual use records is to be acquired. On the other hand, when all actual use records are to be counted in a specified period, the actual use records in the period are to be acquired. Thus, when the actual use records are to be counted, performance for searching and acquiring the data while the storage service described above is being used may cause some issues.

According to the technique as discussed in Japanese Patent Application Laid-Open No. 2000-207413 described above, when performing search, the user is to designate information that can specify the database. Thus, since the user may need to recognize the location of the data to be acquired, a merit that the user does not have to perform operation or management by using the above-described storage service, is reduced.

SUMMARY OF THE INVENTION

According to an aspect of the present invention, an apparatus includes: a setting unit configured to set a condition for acquiring first data from a data management system; a collection unit configured to collect second data of an image forming device; an addition unit configured to add a key matching the set condition to produce third data; and a transmission unit configured to transmit the third data to the data management system.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 8 illustrates an example of a table of stored count setting information.

FIG. 9 illustrates an example of a correspondence table between a client code added to a print job and a key.

DESCRIPTION OF THE EMBODIMENTS

Various exemplary embodiments, features, and aspects of the invention will be described in detail below with reference to the drawings.

Figure 1:
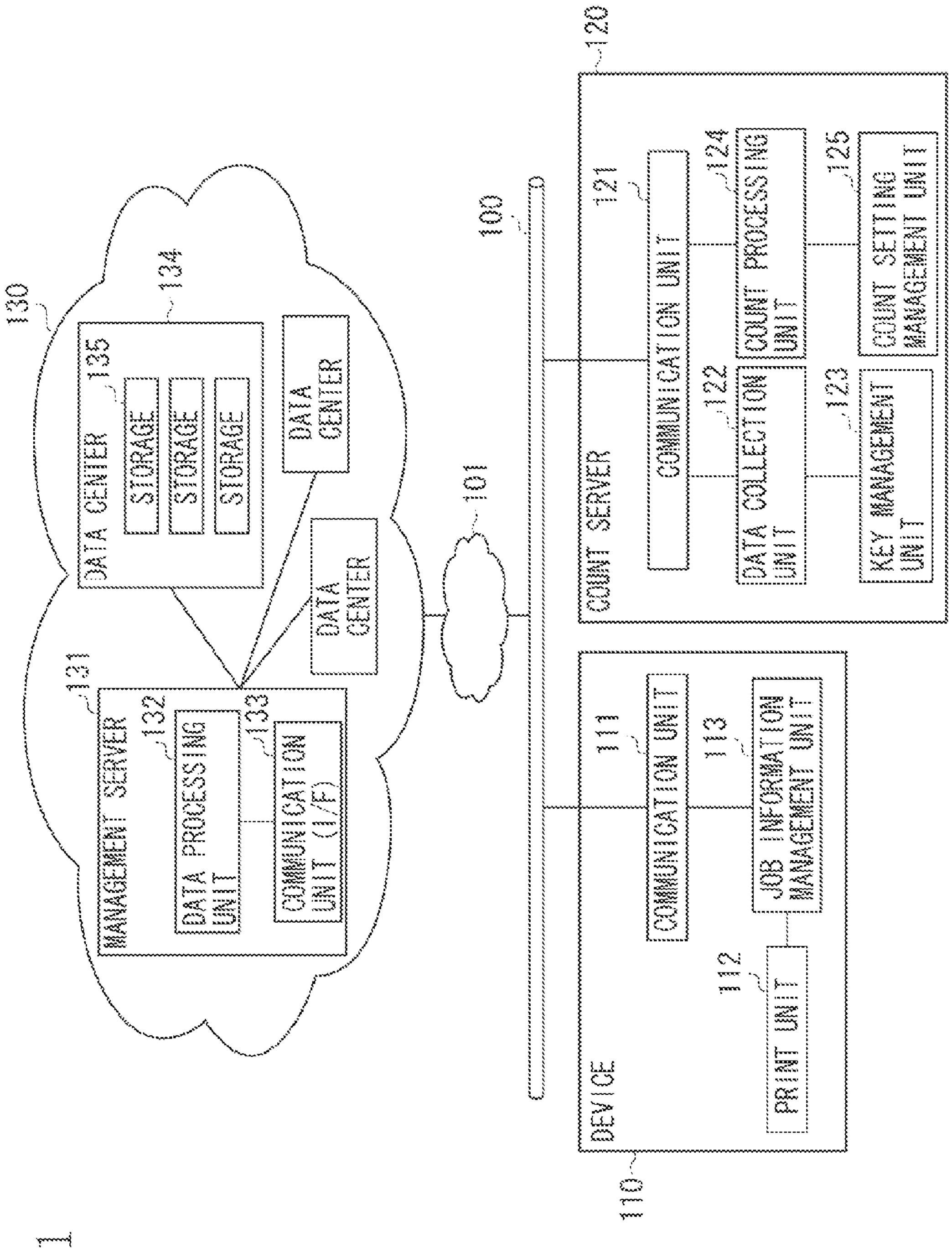
FIG. 1 illustrates an example of a system configuration.

FIG. 1 illustrates an example of a system configuration according to the present exemplary embodiment. A device 110 is an image forming device such as a copy machine. A count server 120 counts actual use records of the device 110. The device 110 and the count server 120 are included in an intranet and connected with each other via a network 100. A plurality of devices may be included, and in this case, the count server 120 manages a plurality of devices.

A network via the internet 101 includes a count data management system 130 (example of a data management system) providing a storage service. The count data management system 130 includes a management server 131 and a data center 134 managed thereby. The count server 120 can receive the storage service provided by the count data management system 130 via the internet 101.

The device 110 includes a communication unit 111, a print unit 112, and a job information management unit 113. The communication unit 111 has a function for communicating with the count server 120. The print unit 112 has a function for receiving a print request by a user's direct operation on the device 110 or via the network 100 to perform printing. The job information management unit 113 has a function for creating and storing history information (job log) about printing and scanning. The job log includes information about a user's name, performance date and time, and the number of performed printing and scanning.

The count server 120 includes a communication unit 121, a data collection unit 122, a key management unit 123, a count processing unit 124, and a count setting management unit 125. The communication unit 121 has a function for communicating with the device 110. The data collection unit 122 has a function for collecting a job log of the device 110. To collect the job log, the data collection unit 122 may periodically access the device 110 to acquire the data, or the device 110 may transmit the data to the count server 120 when creating the job log.

The count setting management unit 125 manages information (count setting information) about count setting such as a time and a unit of counting for counting the actual use records of the device 110, and has a function for storing the count setting information in a hard disk drive (HDD) 308 that will be described below. The count setting is performed by a manager via a user interface (UI) of the count server 120. The key management unit 123 has a function for creating a key for appropriately storing the job log collected by the data collection unit 122 in a count data management system 130 according to the count setting information and adding the key to the job log. The count processing unit 124 has a function for counting the job log.

The management server 131 includes a data processing unit 132 and a communication unit 133. The communication unit 133 has a function as the interface (I/F), and for example, receives a request from the count server 120 for providing the storage service. The data processing unit 132 has a function for processing the data from the count server 120.

A data center 134 includes a storage 135 and has a function for storing the data in the storage 135 according to an instruction by the management server 131.

Figure 2:
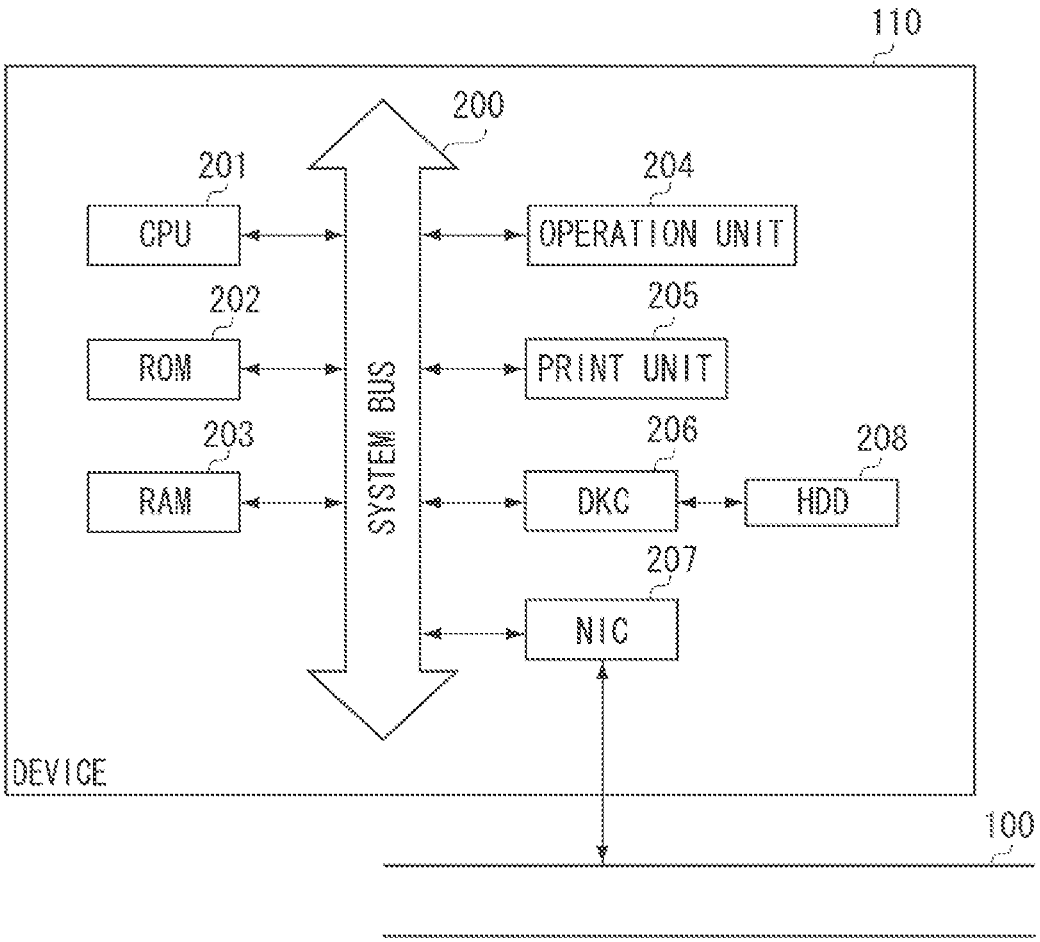
FIG. 2 illustrates an example of a hardware configuration of a device.

FIG. 2 illustrates an example of a hardware configuration of a device 110. A central processing unit (CPU) 201 controls each configuration connected to a system bus 200 based on a control program and outputs an image signal to a print unit (printer engine) 205 as output information. The control program is stored in a read only memory (ROM) 202 or a hard disk (HDD) 208.

Further, the CPU 201 communicates with a computer on the network 100 via a network interface card (NIC) 207. A random access memory (RAM) 203 functions as a main memory or a work area of the CPU 201. An operation unit 204 includes a switch and a light emitting diode (LED) display device to perform operations.

Figure 3:
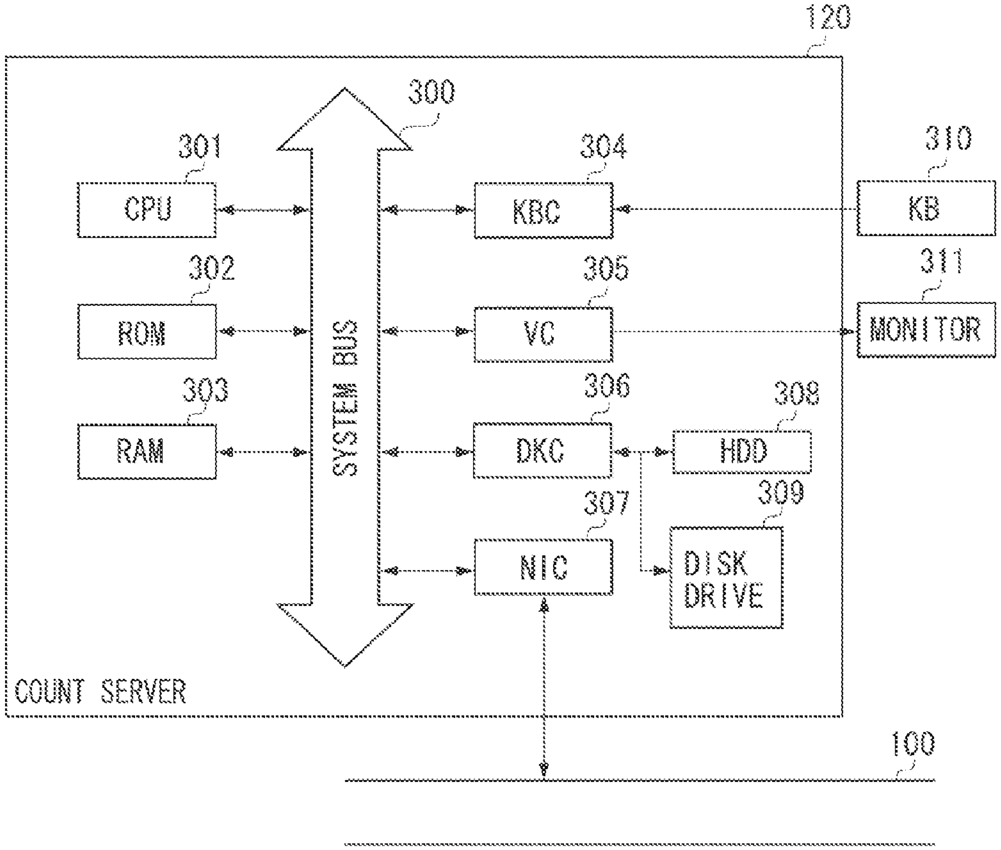
FIG. 3 illustrates an example of a hardware configuration of a count server.

FIG. 3 illustrates an example of a hardware configuration of a count server 120. A CPU 301 includes a RAM 303 as a work memory and executes a program stored in a ROM 302 or a HDD 308, and then controls each configuration that will be described below via a system bus 300. The HDD 308 stores an operating system (OS), each program, and, data.

Further, the CPU 301 accesses the HDD 308 or the disk drive 309 via a disk controller (DKC) 306 to install each program in the HDD 308. Furthermore, the CPU 301 displays the UI on a monitor 311 via a video card (VC) 305 according to the program. The user operates a pointing device such as a keyboard (KB) 310 and a mouse to perform an instruction or input to the UI.

Moreover, the CPU 301 receives the user's instruction and input via a keyboard controller (KBC) 304 to execute various processing according to the user's instruction and input. Further, the CPU 301 communicates with other computers and devices on the network 100 via a NIC 307. Furthermore, the CPU 301 also communicates with other computers and devices on the internet 101 via the NIC 307.

The management server 131 has a hardware configuration similar to that of the count server 120. For example, the CPU of the management server 131 communicates with a storage 135 in the count data management system 130 via the NIC or other computers (e.g., count server 120) via the internet 101.

Based on the above-described configuration, a method for managing the job log using the count data management system 130 will be described. The count server 120 is an example of an information processing apparatus. The CPU 301 executes processing according to a method of a program stored in the ROM 302 or the RAM 303 to realize the function of the count server 120 and the processing of the flowchart that will be described below. The management server 131 functions and performs in a similar manner to the count server 120.

Figure 4:
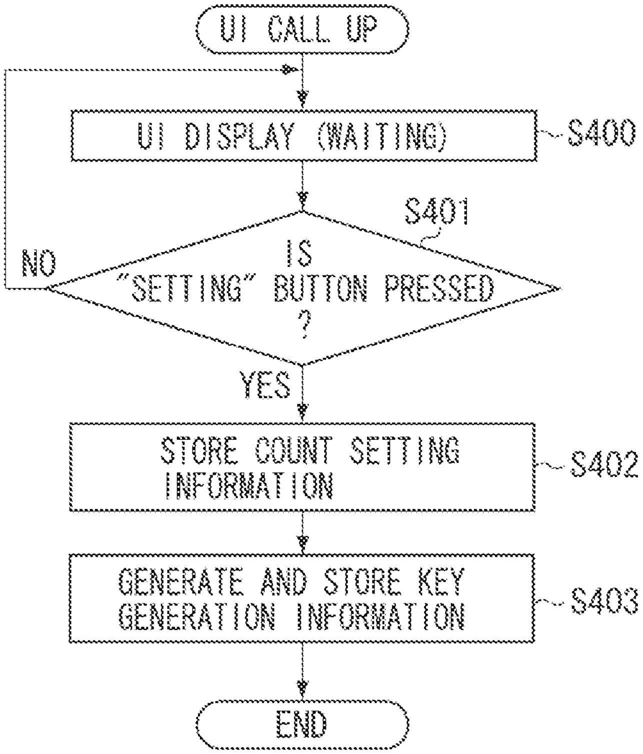
FIG. 4 is an example of a flowchart illustrating count setting processing.

FIG. 4 is an example of a flowchart illustrating processing (count setting processing) for performing count setting. In step S400, the count setting management unit 125 displays a count setting screen serving as the UI in response to a manager's operation performed on the pointing device.

Figure 5:
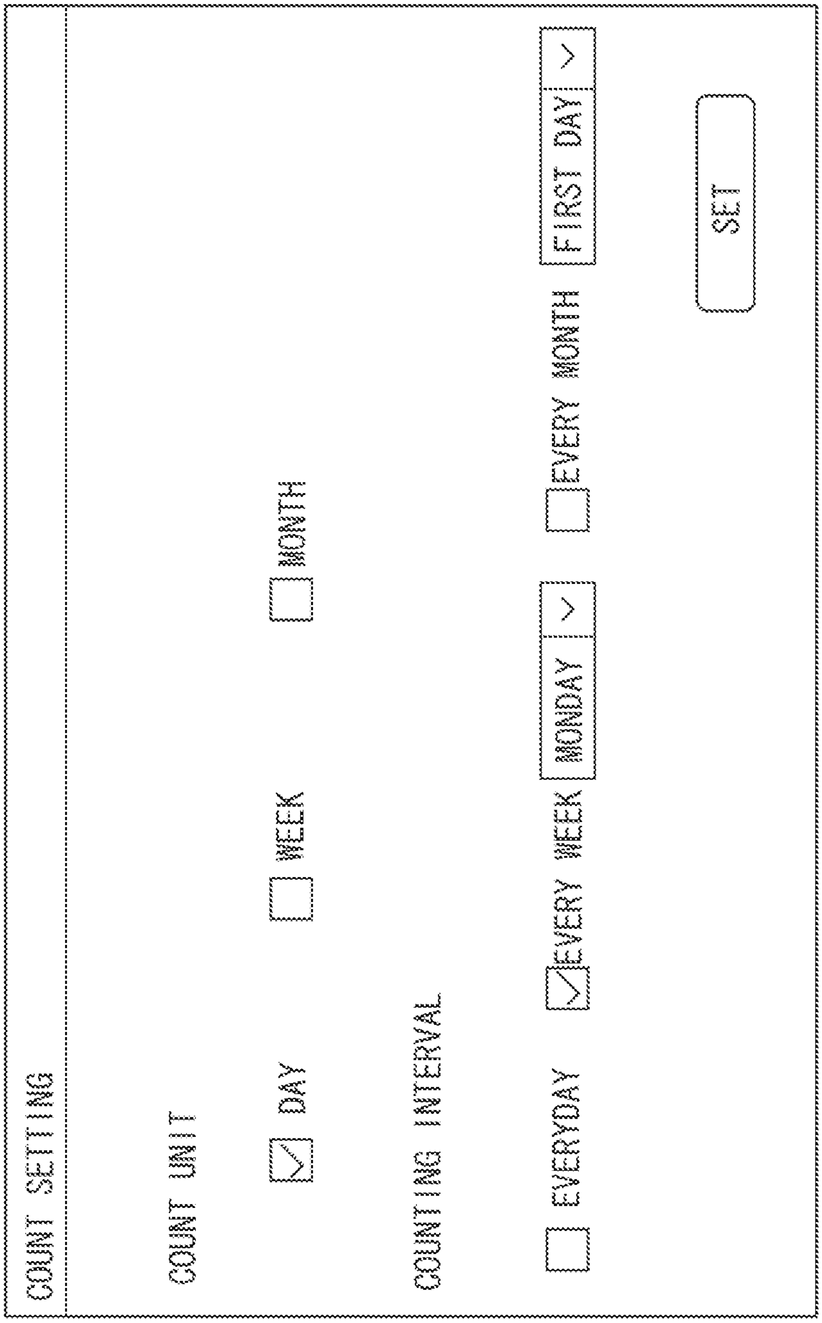
FIG. 5 illustrates an example of a count setting screen.

FIG. 5 illustrates an example of a count setting screen for setting a condition for acquiring the job log from the count data management system 130. The manager operates the pointing device to specify a unit of counting and a count performance interval to the UI. For example, when the unit of counting is specified as "DAY" and the count performance interval is specified as "EVERY WEEK (MONDAY)", the count processing unit 124 counts (calculates) the records of each day for one week on every Monday.

In step S401, the count setting management unit 125 determines whether the manager has pressed a "setting" button. When the count setting management unit 125 determines that the "setting" button is pressed (YES in step S491), the processing proceeds to step S402. When the count setting management unit 125 determines that the "setting" button is not pressed (NO in step S401), the processing of step S401 is repeatedly performed. In step S402, the count setting management unit 125 stores in the HDD 308 the count setting information including information about the unit of counting and the count performance interval specified via the count setting screen.

In step S403, the key management unit 123 creates key creation information from the count setting information and stores the key creation information in the HDD 308.

More specifically, since the job log to be counted is determined from the count setting information when the count is performed at the first time, the key management unit 123 creates the key creation information so that the same key is added to the count setting information. The key is formed of string of characters or numeral values. For example, when the count setting information includes the information in which the count is performed for a "DAY" and "EVERY WEEK (MONDAY)", the job log to be counted at a time includes the job log for one week.

Thus, the key management unit 123 creates the key creation information so that the same key is added to the job log occurred from a previous Monday to Sunday of each week. Further, for example, when the count setting information includes the information in which the count is performed for a "DAY" and "EVERY DAY", the job log to be counted at a time includes the job log for one day. Accordingly, the key management unit 123 creates the key creation information so that the same key is added to the job log for one day.

Figure 6:
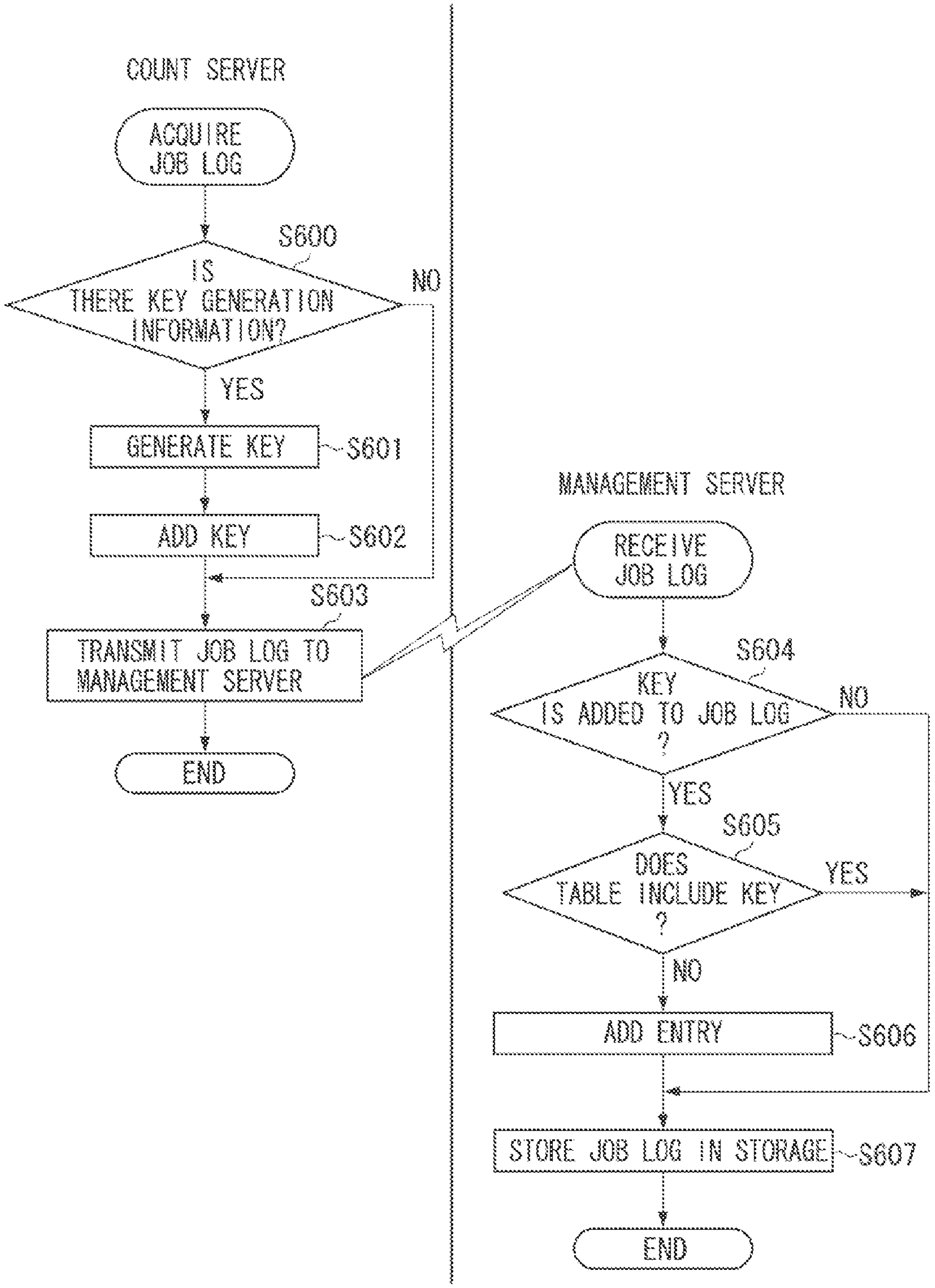
FIG. 6 is an example of a flowchart illustrating job log storage processing.

FIG. 6 is an example of a flowchart illustrating processing (job log storage processing) for storing the job log in the count data management system 130. The data collection unit 122 of the count server 120 periodically collects the job log from the device 110.

In step S600, the key management unit 123 determines whether the HDD 308 includes the key creation information. When it is determined that the HDD 308 includes the key creation information (YES in step S600), the key management unit 123 performs processing of step S601. When it is determined that the HDD 308 does not include the key creation information (NO in step S600), the key management unit 123 performs processing of step S603. In step S601, the key management unit 123 creates the key based on the key creation information.

For example, when the key creation information indicates that the same key is added each week, the key management unit 123 creates the key that is the same as the key to be added to the job log each week. More specifically when the current one week is the first (Monday)/February/2010 to the seventh (Sunday)/February/2010, the key management unit 123 creates the string of characters "20100201" as the key. In step S602, the key management unit 123 adds the key to the job log. The key management unit 123 subsequently performs processing of step S603.

In step S603, the communication unit 121 transmits the job log to the count data management system 130. When it is determined that the HDD 308 does not include the key creation information in step S600, the count setting has not been performed by the manager, and thus how the data is to be acquired in the future is not determined. When it is determined that the HDD 308 does not include the key creation information, the communication unit 121 transmits to the count data management system 130 the job log to which the key is not added. The job log is transmitted in asynchronous processing, and the count server 120 ends the processing when the transmission is completed.

On the other hand, the communication unit 133 of the management server 131 receives the log job. In step S604, the data processing unit 132 determines whether the key is added to the received job log. When it is determined that the key is added to the job log (YES in step S604), the data processing unit 132 subsequently performs the processing of step S605. When it is determined that the key is not added to the job log (NO in step S604), the data processing unit 132 subsequently performs the processing of step S607.

In step S605, the data processing unit 132 determines whether the key added to the job log is a known key. More specifically, the data processing unit 132 causes the HDD to hold a storage location table for storing information including paired key and storage location, and determines whether the key is a known key with reference to the storage location table.

When it is determined that the corresponding key is not included in the storage Location table (NO in step S605), in step S606, the data processing unit 132 determines an appropriate storage location, newly adds the information including the paired key and determined storage location, and then the data processing unit 132 performs the processing of step S607. When it is determined that the corresponding key is included in the storage location table (YES in step S605), the data processing unit 132 performs the processing of step S607.

In step S607, the data processing unit 132 stores the job log in the storage and ends the processing. More specifically, when it is determined that the key is not added to the job log (NO in step S604), in step S607, the data processing unit 132 stores the job log in an arbitrary storage location. Further, when it is determined that the corresponding key is included in the storage location table (YES in step S605), in step S607, with reference to the storage table, the data processing unit 132 confirms the storage location corresponding to the key and stores the job log in the storage of the corresponding data center.

When it is determined that the corresponding key is not included in the storage Location table (NO in step S605), in step S606, the data processing unit 132 confirms the determined storage location, and in step S607, stores the job log in the storage of the corresponding data center.

The count server 120 performs the count according to the count setting information. For example, when the count is performed "EVERY MONDAY", an acquisition request including information (e.g., a key "20100201") for acquiring the job log for one week is transmitted to the count data management system 130 on Monday. In response to the request, the count data management system 130, with reference to the storage location table for example, specifies the storage location (storage) of the requested data, acquire the requested data therefrom, and then transmits the acquired data to the count server 120.

As described above, since, when the data is stored, the object data to be acquired at a time is stored in the same storage location, a time for acquiring the data can be decreased compared to when the data is separately stored in a plurality of storage locations. The count server 120 causes the count processing unit 124 to count the job log using the acquired data.

In the first exemplary embodiment, the configuration is described in which the count server 120 collects the job log of the device 110 and stores the job log in the count data management system 130. In a second exemplary embodiment of the present invention, a unique configuration will be described in which the device 110 has a function for communicating with the count data management system 130 and transmits the job log from itself to the count data management system 130.

The same reference numerals will be given to the configuration and processing that are the same as those in the first exemplary embodiment, and descriptions thereof will not be repeated. The count setting processing according to the present exemplary embodiment is basically the same as that of the flowchart illustrated in FIG. 4 according to the first exemplary embodiment. In the first exemplary embodiment, an example for performing the count for each period is described. In the present exemplary embodiment, an example for performing the count for each client will be described. In the present exemplary embodiment, first, the count setting information, the key creation information, and the key will be described.

Figure 7:
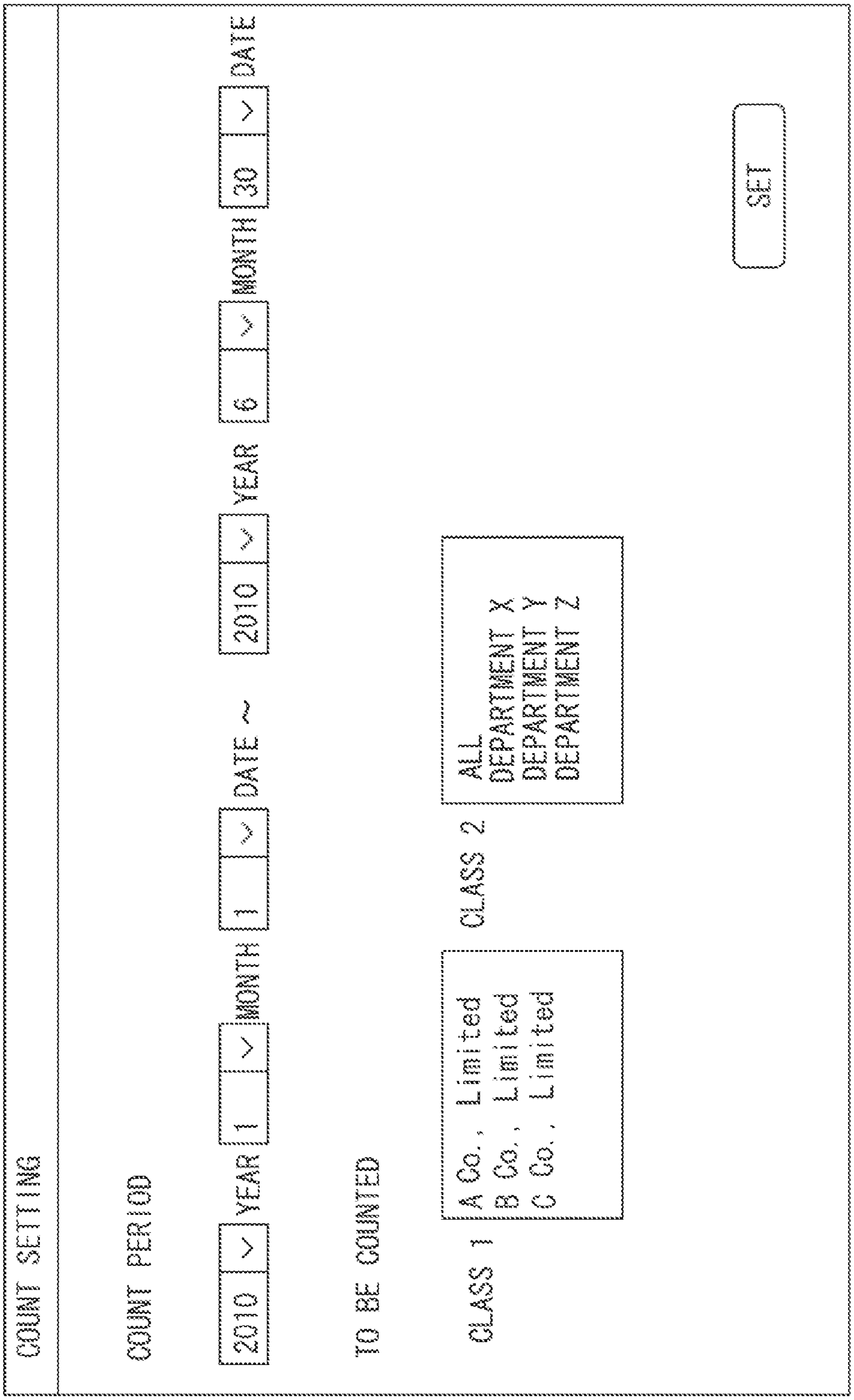
FIG. 7 illustrates an example of a count setting screen.

FIG. 7 illustrates an example of the count setting screen. The manager operates the pointing device to specify the count period and the count object for the UI of the count server 120. Typically, when the device 110 performs printing, a technique for adding a client code to the print job with a printer driver is used. This technique is used by a legal office for charging expenses spent for printing for each client. A method for expressing the client code in a plurality of layers is used.

For example, a company name is set in a first layer, a department name is set in a second layer, and when printing is performed, the client code, for example, “First Layer: A Co., Limited” and “Second Layer: DEPARTMENT X” are added to the print job. According to the present exemplary embodiment, using the above-described technique, the client code is hereinafter described as, for example, “<First Layer>-<Second Layer>”. For example, when expenses of a client of “DEPARTMENT “Y” in “B” Co., Limited” from 1 Jan. 2010 to 30 Jun. 2010 is to be charged, the manager sets the count period to “2010/1/1 to 2010/6/30” and the count object to “<“B” Co., Limited>-<DEPARTMENT “Y”>”.

FIG. 8 illustrates an example of a table of the stored count setting information. The table stores information about count setting IDs, client codes to be counted, count starting dates, and count ending data. This example describes that “<“B” Co., Limited>-<DEPARTMENT “Y”>”, “<“A” Co., Limited>-<DEPARTMENT “X”>”, and “<“C” Co., Limited>-<ALL>” are, used as the client codes to be counted. “<“C” Co., Limited>-<ALL>” indicates that the job log of the printing job for the “C” Co., Limited does not depend on the department in the second layer but all of the departments are to be counted. When the count ending date for each client code is completed, the count server 120 performs the count. The key management unit 123 creates the key creation information such that the same key is added to the job log for each count object (client code to be counted).

FIG. 9 illustrates an example of a correspondence table between the client code added to the print job and the key. According to the example of the correspondence table, a key of “A-X” is added to the job log of the print job to which JOB ID: 1 “<“A” Co., Limited>-<DEPARTMENT “X”>” is added. Similarly, a key of “B-Y” is added to the job log of “JOB ID: 3” and “JOB ID: 6”, and a key of “C-ALL” is added to the job log of “JOB ID: 2” and “JOB ID: 4”. “JOB ID: 5” includes the object client code of “<“A” Co., Limited>-<DEPARTMENT “Z”>”, which is a combination of client codes that are not included in the count setting information, and thus there is no key applied.

Figure 10:
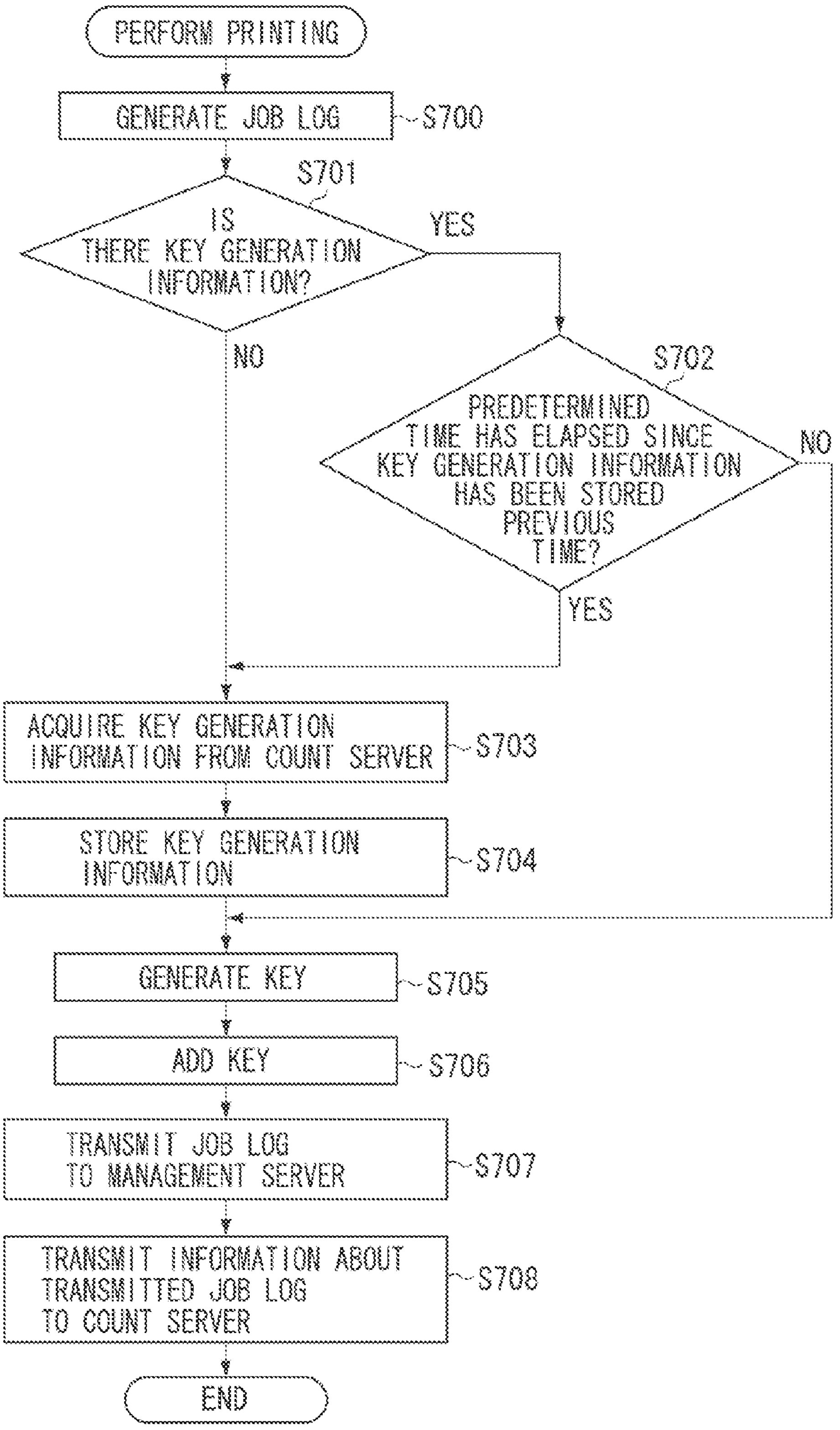
FIG. 10 is an example of a flowchart illustrating job log storage processing.

FIG. 10 is an example of a flowchart illustrating processing (job log storage processing) for storing the job log in the count data management system 130. When the print unit 112 performs printing, in step S700, the job information management unit 113 creates the job log. Subsequently, in step S701, the job information management unit 113 determines whether the HDD 208 of the device 110 includes the key creation information. When it is determined that the HDD 208 of the device 110 includes the key creation information (YES in step S701), the job information management unit 113 performs processing of step S702. When it is determined that the HDD 208 of the device 110 does not include the key creation information (NO in step S701), the job information management unit 113 subsequently performs processing of step S703.

In step S702, the job information management unit 113 determines whether a predetermined time has elapsed since the key creation information has been stored (or acquired) at a previous time. When it is determined that a predetermined time has elapsed since the key creation information has been stored (or acquired) at a previous time (YES in step S702), the job information management unit 113 subsequently performs processing of step S703. When it is determined that a predetermined time has not elapsed since the key creation information has been stored at a previous time (NO in step S702), the job information management unit 113 subsequently performs processing of step S705.

In step S703, the jab information management unit 113 communicates with the count server 120 via the communication unit 111 to acquire the key creation information held by the count server 120. When the job information management unit 113 determines that the predetermined time has elapsed in the processing of step S702, the count setting information may be updated. Thus, the job information management unit 113 acquires the key creation information from the count server 120 again. In step S704, the job information management unit 113 stores the acquired key creation information in the HDD 208 and also records a time when the key creation information is stored (or a time when the key creation information is acquired).

According to the present exemplary embodiment, the key for the job log is not acquired from the count server 120 every time printing is performed and the job log is created, but the key creation information is held in the device, the key is created therein, and added to the job log. With this configuration, communication traffic between the device 110 and the count server 120 can be reduced. Further, each device creates the key using the key creation information that is the same as that acquired from the count server 120 such that the same key can be added to the job log of different devices that is acquired collectively at a time by the count server 120.

According to the present exemplary embodiment, the configuration is described in which, in timing that the device 110 creates the job log, the key creation information is acquired from the count server 120. However, the present invention is not limited to this configuration. For example, the count server 120 may notify the device 110 of the key creation information.

More specifically, the count server 120 may previously manage the management target device, and when the count setting information is updated, the count server 120 may transmit the key creation information to the device. Further, for example, the count server 120 may notify the device of the information indicating updating, and then the device may acquire the key creation information at an arbitrary timing. The device may acquire the count setting information for creating the key from the count server 120 to create the key.

In step S705, the job information management unit 113 creates the key based on the key creation information. Subsequently, in step S706, the job information management unit 113 adds the key to the job log. In step S707, the job information management unit 113 transmits the job log to the count data management system 130 via the communication unit 111. When the device 110 has a function for communicating with the count data management system 130, since the job log can be stored in the count data management system 130 without the count server 120, the work can be distributed. The processing performed after the job log has been received in the count data management system 130 is performed in a similar manner to that performed in steps S604, S605, S606, and S607 illustrated in the first exemplary embodiment.

In step S708, the jab information management unit 113 notifies the count server 120 of the information about the job log transmitted via the communication unit 111 in step S707. The information to be notified is not the job log itself but a serial number that can identify the job log. According to the configuration described above, the manager can refer to a job log list for all devices stored in the count data management system 130 on the UI of the count server 120. The count server 120 performs the count similarly to that in the first exemplary embodiment.

In the first and second exemplary embodiments, the count server 120 counts the actual use records of the device 110 included in the same intranet. In a third exemplary embodiment, a configuration will be described in which the count server 120 manages the devices disposed at a plurality of locations and counts the actual use records of the devices. The same reference numerals will be given to the configuration and processing that are the same as those in the first and second exemplary embodiments, and descriptions thereof will not be repeated.

Figure 11:
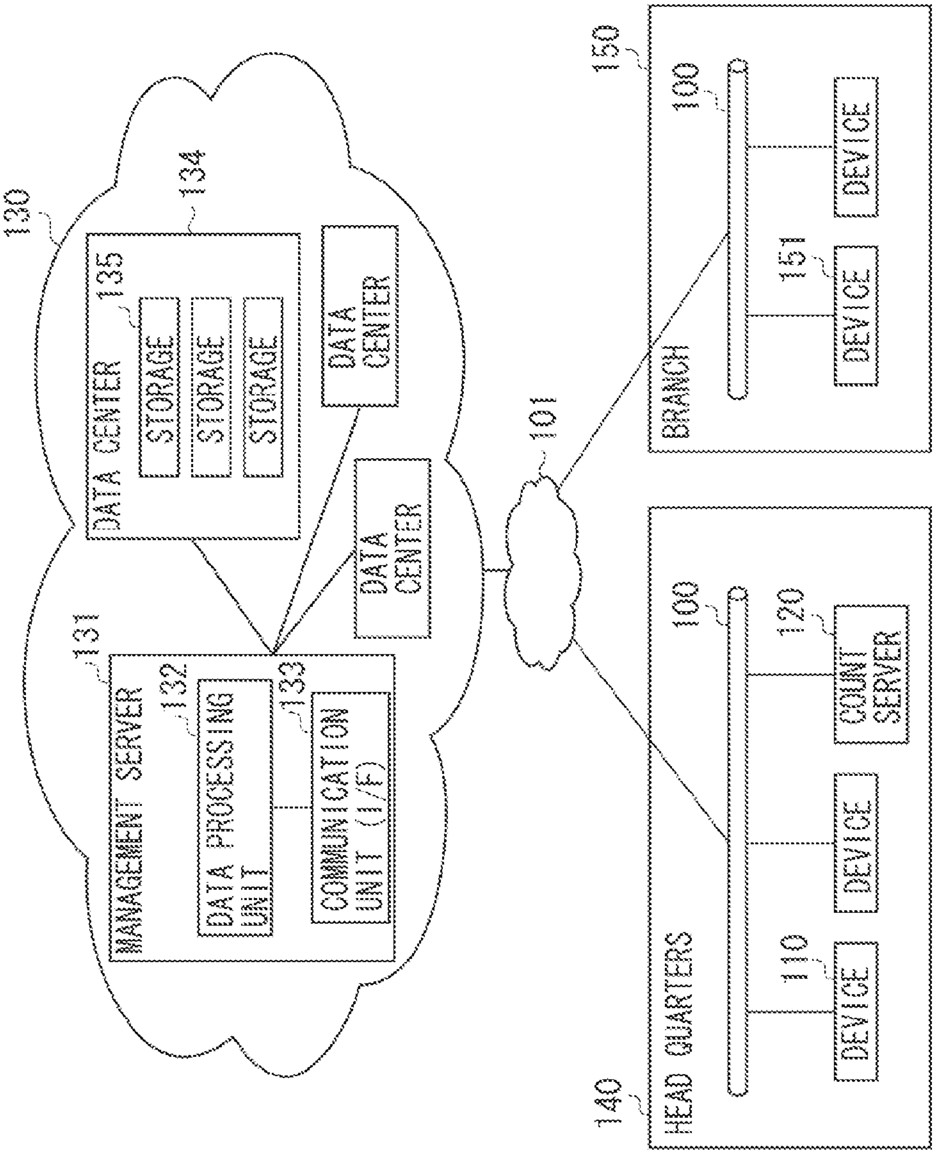
FIG. 11 illustrates an example of a system configuration.

FIG. 11 illustrates an example of a system configuration according to the present exemplary embodiment. The intranet in a head quarter 140 includes the devices 110 and the count server 120. The intranet in a branch 150 includes devices 151. The device 151 has the same configuration as that of the device 110.

For example, the device 151 has a function for communicating with the count data management system 130 and a unique configuration for transmitting the job log from itself to the count data management system 130 illustrated in the second exemplary embodiment. The branch 150 may include a plurality of devices, and each of them performs the same processing. A plurality of branches may be provided. According to the present exemplary embodiment, the count server 120 in the head quarters 140 collectively counts the job log of the devices in the head quarters 140 and the branches 150.

Figure 12:
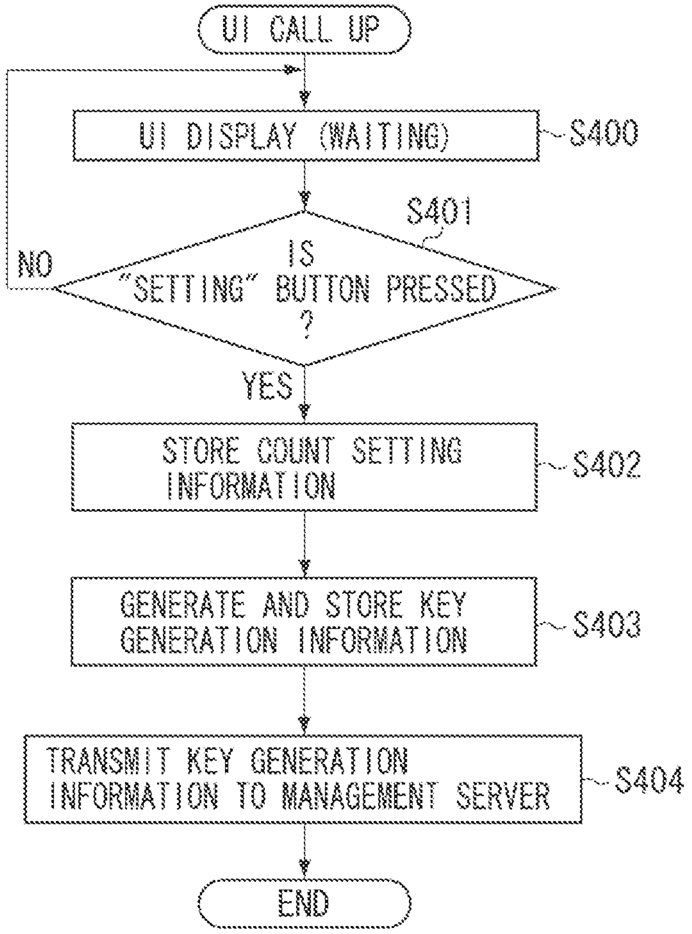
FIG. 12 is an example of a flowchart illustrating count setting processing.

FIG. 12 is an example of a flowchart illustrating processing (count setting processing) for setting the count. The processing in steps S400, S401, S402, and S403 is performed in a similar manner to that of the flowchart illustrated in FIG. 4. In step S904, the communication unit 121 of the count server 120 transmits to the count data management system 130 the same key creation information as that stored in the HDD 308 in step S403. Upon receiving the key creation information via the communication unit 133, the management server 131 of the count data management system 130 stores the key creation information in the HDD of the management server 131.

Next, processing (job log storage processing) for storing the job log in the count data management system 130 will be described. The processing for storing the job log created by the device 110 in the head quarters 190 is the same as that in the first and second exemplary embodiments. More specifically, when the device 110 does not have a function for communicating with the count data management system 130, the processing of the flowchart illustrated in FIG. 6 according to the first exemplary embodiment is performed.

When the device 110 has the function for communicating with the count data management system 130, the processing of the flowchart illustrated in FIG. 10 according to the second exemplary embodiment is performed. The head quarters 140 may include both types of the devices described in the first and second exemplary embodiments. When the head quarters 140 includes both types thereof, the count server 120 collects the data of the device (in other words, previously specified device), of a plurality of devices, having no function for communicating with the count data management system 130.

Figure 13:
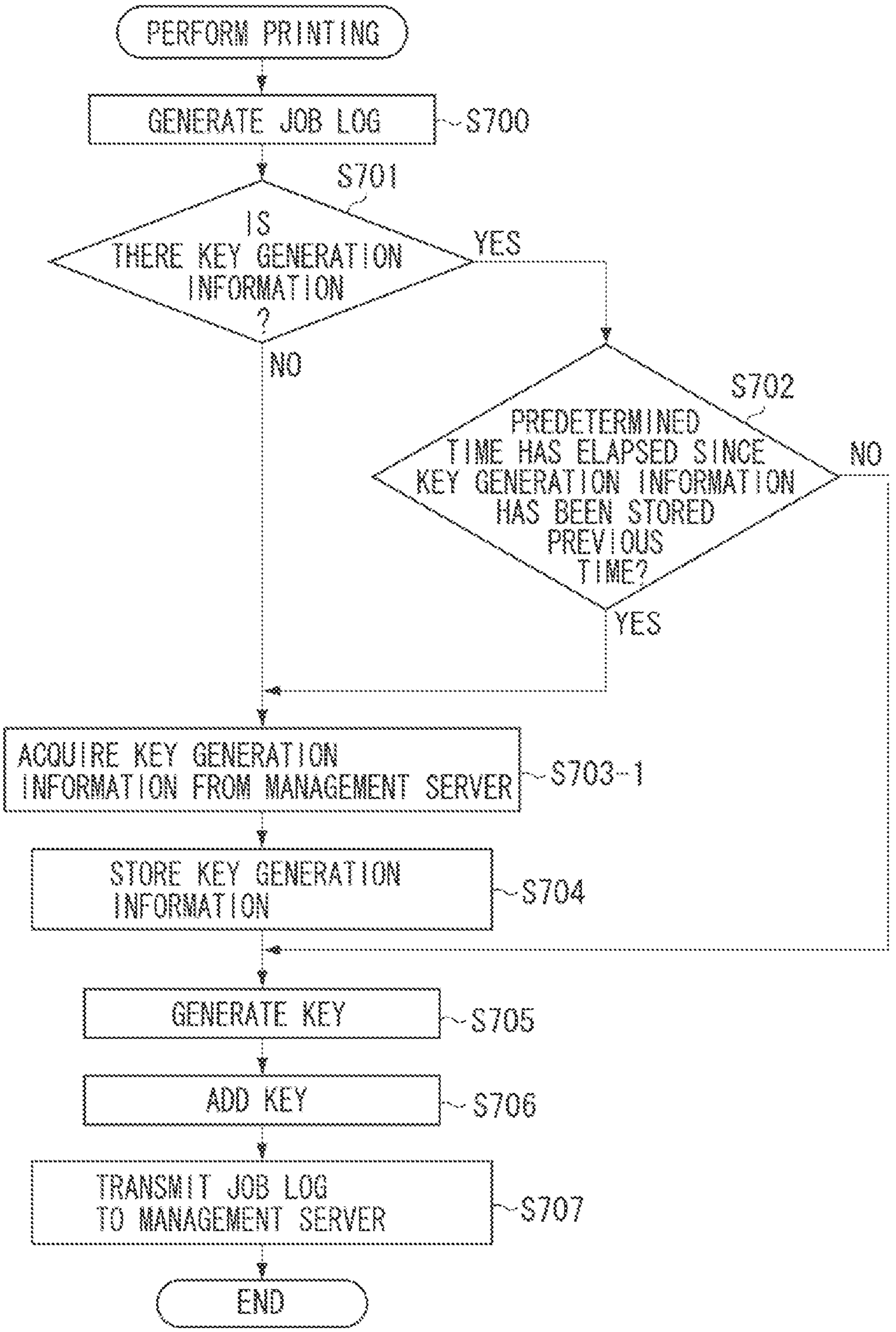
FIG. 13 is an example of a flowchart illustrating job log storage processing.

FIG. 13 is an example of a flowchart illustrating processing (job log storage processing) for storing the job log created by the device 151 in the branch 150 in the count data management system 130. The processing performed in steps S700, S701, and S702, and steps S709, S705, S706, and S707 is performed in a similar manner to that of the flowchart illustrated in FIG. 10 according to the second exemplary embodiment.

In step S703-1 (when the HDD of the device 151 does not include key creation information, or when the key creation information is to be updated), the device 151 communicates with the count data management system 130 to acquire the key creation information held by the management server 131. The count server 120 performs the count in a similar manner to that in the first exemplary embodiment.

According to the present exemplary embodiment, a method is described in which each device in the branch 150 communicates with the count data management system 130 to acquire the key creation information. As another method, using one of the devices in the branch 150, only a master device may acquire the key creation information from the count data management system 130. In that case, other devices in the branch 150 acquire the key creation information from the master device.

When the device 110 in the head quarters 140 has a function for communicating with the count data management system 130 and transmits the job log from itself to the count data management system 130, similarly to the device 151, the key creation information may be acquired from the count data management system 130. With the configurations described above, even when the count server 120 in the head quarters 140 collectively counts the job log without disposing the count server 120 in the branch 150, the data can be appropriately stored.

As described above, the methods for managing the job log using the storage service are described in the first, second, and third exemplary embodiments. However, the configurations can be applied to the data other than the job log. As an example, use of the count setting information as the information for creating the key is described. However, as long as the information can classify the storage location when the data is stored, the information other than the count setting information can be used.

In the first, second, and third exemplary embodiment, to improve performance for acquiring the job log from the provided system when counting, the storage locations are classified for each job log to be collectively acquired at a time. However, the present invention is not limited to this configuration. For example, the storage locations of the job log may be classified for each client so that the data of the client demanding high security can be stored in the storage location having high security with a high service charge.

Further, the storage locations of the job log can be classified according to a security level so that the job log for printing a highly confidential document can be stored in the storage location having further higher security.

The present invention can be realized by performing the following processing. More specifically, software (program) for realizing the functions of the above-described exemplary embodiments is supplied to a system or a device via the network or various types of storage media, and then the computer (or CPU or micro processing unit (MPU)) of the system or the device reads and executes the program.

The exemplary embodiments of the present invention have been described in detail as mentioned above. However the present invention is not limited to the specific exemplary embodiment. It is understood that numerous other modifications and variations can be devised without departing from the scope of the invention described in the claims to be claimed.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-100816 filed Apr. 26, 2010, which is hereby incorporated by reference herein in its entirety.

What is claimed is:

1. A count server communicating with a data management system that manages data of an image forming device by using a plurality of data centers, the count server comprising:

a setting unit configured to set count setting information related to a condition for acquiring target data to be counted from the data management system;

a collection unit configured to collect first data of the image forming device;

an addition unit configured to add a key matching the count setting information to the collected first data to produce second data; and a transmission unit configured to transmit the second data to the data management system, wherein the data management system identifies from among the plurality of data centers the data center that corresponds to the key added to the second data according to a storage location table, and wherein the data management system stores the second data in the identified data center.

2. The count server according to claim 1, further comprising a count unit configured to acquire the target data including the second data and compute a count using the acquired target data.

3. The count server according to claim 2, further comprising a request unit configured to send a request for acquiring the target data including the second data to the data management system based on the key, wherein the count unit acquires the target data corresponding to the key from the data management system.

4. The count server according to claim 1, wherein the condition includes a period to be collected or a client code.

5. The count server according to claim 1, wherein the collected first data is job log information related to a job performed by the image forming device.

6. A method performed for communicating with a data management system that manages data of an image forming device by using a plurality of data centers comprising:

setting count setting information related to a condition for acquiring target data to be counted from the data management system;

collecting first data of the image forming device;

adding a key matching the count setting information to the collected first data to produce second data; and transmitting the second data to the data management system, wherein the data management system identifies from among the plurality of data centers the data center that corresponds to the key added to the second data according to a storage location table, and wherein the data management system stores the second data in the identified data center.

7. The method according to claim 6, further comprising acquiring the target data including the second data and computing count using the acquired target data.

8. The method according to claim 7, further comprising:

sending a request for acquiring the target data including the second data to the data management system based on the key, wherein the target data corresponding to the key is acquired from the data management system.

9. The method according to claim 6, wherein the collected first data is job log information related to a job performed by the image forming device.

10. A non-transitory computer readable medium storing a computer-executable program for causing a computer to perform a method comprising:

setting count setting information related to a condition for acquiring target data to be counted from a data management system;

collecting first data of an image forming device;

adding a key matching the count setting information to the collected first data to produce second data; and transmitting the second data to the data management system, wherein the data management system identifies from among the plurality of data centers the data center that corresponds to the key added to the second data according to a storage location table, and wherein the data management system stores the second data in the identified data center.

11. The non-transitory computer readable medium according to claim 10, further comprising acquiring the target data including the second data and computing a count using the acquired target data.

12. The non-transitory computer readable medium according to claim 11, further comprising:

sending a request for acquiring the target data including the second data to the data management system based on the key, wherein the acquiring the target data corresponding to the key is acquired from the data management system.

13. The non-transitory computer readable medium according to claim 10, wherein the collected first data is job log information related to a job performed by the image forming device.

14. An image forming device that creates a job log related to a job performed by the image forming device, the image forming device comprising;

an acquisition unit configured to acquire information about count using the job log;

an addition unit configured to add a key matching count setting information to the job log according to the acquired information; and a transmission unit configured to transmit the job log to which the key is added to a data management system that manages data of the image forming device by using a plurality of data centers, wherein the data management system identifies from among the plurality of data centers the data center that corresponds to the key added to the job log according to a storage location table, and wherein the data management system stores the job with the added key in the identified data center.

15. The image forming device according to claim 14, wherein the acquisition unit acquires, from a count server that acquires data from the data management system and then performs a count using the acquired data, a key used when the count server acquires the data from the data management system as the information about the count.

16. A method for creating a job log related to a job performed by an image forming device, the method comprising:

acquiring information about a count using the job log;

adding a key matching count setting information to the job log according to the acquired information; and transmitting the job log to which the key is added, to a data management system that manages data of the image forming device by using a plurality of data centers, wherein the data management system identifies from among the plurality of data centers the data center that corresponds to the key added to the job log according to a storage location table, and wherein the data management center stores the job log with the added key in the identified data center.

17. A non-transitory computer readable storage medium storing a computer-executable program for causing a computer to perform a method comprising:

acquiring information about a count using a job log;

adding a key matching count setting information to the job log according to the acquired information; and transmitting the job log to which the key is added, to a data management system that manages data of the image forming device by using a plurality of data centers, wherein the data management system identifies from among the plurality of data centers the data center that corresponds to the key added to the job log according to a storage location table, and wherein the data management system stores the job log with the added key in the identified data center.

18. A system that includes a data management system that manages data of an image forming device by using a plurality of data centers and a count server for acquiring target data to be counted and computing a count, the count server comprising:

a setting unit configured to set count setting information related to a condition for acquiring the target data from the data management system;

a request unit configured to send a request for acquiring the target data to the data management system based on the key, a count unit configured to acquire the target data corresponding to the key from the data management system and compute a count using the acquired target data, wherein the data management system identifies from among the plurality of data centers the data center corresponding to the key added to the data according to a storage location table, and wherein the data management system acquires and transmits the target data from the identified data center.

19. The system according to claim 18, wherein the image forming apparatus comprises:

an acquisition unit configured to acquire the key;

an addition unit configured to add the key to the data to be transmitted to the data management system; and a transmission unit configured to transmit the data to which the key is added to the data management system, wherein the target data requested by the request unit is acquired from among the data managed by the data management system.

20. A method performed by a system that includes a management system that manages first data of an image forming device and a count server that acquires second data from the data management system and computes a count, wherein the count server comprises:

setting count setting information related to a condition for acquiring the target data from the data management system;

sending a request for acquiring the target data to the data management system based on the key; and acquiring the target data corresponding to the key from the data management system and computing count using the acquired target data, wherein the data management system identifies from among the plurality of data centers the data center corresponding to the key added to the data according to a storage location table, and wherein the data management system acquires and transmits the target data from the identified data center.

* * * * *